(12) United States Patent
Smith

(10) Patent No.: US 10,150,187 B2
(45) Date of Patent: Dec. 11, 2018

(54) TRAILING EDGE COOLING ARRANGEMENT FOR AN AIRFOIL OF A GAS TURBINE ENGINE

(71) Applicant: Bruce L. Smith, Oviedo, FL (US)

(72) Inventor: Bruce L. Smith, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 663 days.

(21) Appl. No.: 13/951,704

(22) Filed: Jul. 26, 2013

(65) Prior Publication Data

US 2015/0030432 A1    Jan. 29, 2015

(51) Int. Cl.
| | |
|---|---|
| *F01D 5/18* | (2006.01) |
| *B23P 6/00* | (2006.01) |
| *F01D 5/00* | (2006.01) |
| *F01D 5/28* | (2006.01) |

(52) U.S. Cl.
CPC .............. *B23P 6/002* (2013.01); *F01D 5/005* (2013.01); *F01D 5/186* (2013.01); *F01D 5/187* (2013.01); *F01D 5/288* (2013.01); *F05D 2230/80* (2013.01); *F05D 2240/122* (2013.01); *Y10T 29/49238* (2015.01)

(58) Field of Classification Search
CPC .......... F01D 5/005; F01D 5/186; F01D 5/187; B23P 6/002; F05D 2230/80; F05D 2240/122; F05D 2260/83; Y10T 29/49341
See application file for complete search history.

(56) References Cited

U.S. PATENT DOCUMENTS

| | | | | |
|---|---|---|---|---|
| 5,726,348 | A | * | 3/1998 | Draghi .................... F01D 5/187 73/37 |
| 6,398,503 | B1 | * | 6/2002 | Takahashi ............... F16L 59/00 416/241 B |
| 6,471,479 | B2 | * | 10/2002 | Starkweather .......... F01D 5/187 416/97 R |
| 7,118,337 | B2 | | 10/2006 | Liang |
| 7,549,844 | B2 | | 6/2009 | Liang |
| 7,980,821 | B1 | | 7/2011 | Liang |
| 8,096,770 | B2 | | 1/2012 | Liang |

(Continued)

FOREIGN PATENT DOCUMENTS

| | | |
|---|---|---|
| EP | 0816635 A2 | 1/1998 |
| EP | 1507881 B1 | 12/2008 |
| EP | 2423346 A1 | 2/2012 |

*Primary Examiner* — David E Sosnowski
*Assistant Examiner* — Juan G Flores

(57) ABSTRACT

An airfoil (112) including an internal cooling circuit (136) to direct cooling fluid (120) through an interior of the airfoil. The airfoil also includes a trailing edge (114') defining plugged holes (115) and cooling holes (116) along a radial direction (117). A selective group (314) of the cooling and plugged holes are based on a reduced cooling fluid requirement at the trailing edge (114') resulting from an improved thermal barrier coating (126). A process (200) is also provided including removing (202) an airfoil from service in a gas turbine engine and adding or improving (204) a thermal barrier coating on the airfoil. The process also includes selectively (206) plugging holes in the airfoil in response to a reduced cooling fluid required through the airfoil as a result of the added or improved thermal barrier coating.

7 Claims, 4 Drawing Sheets

(56) References Cited

U.S. PATENT DOCUMENTS

2004/0226682 A1\* 11/2004 Ehrhard .................... F01D 5/18
                                                    165/11.1
2009/0238695 A1     9/2009 Devore
2013/0104517 A1\*  5/2013 Correia ..................... F01D 5/18
                                                    60/39.091

\* cited by examiner

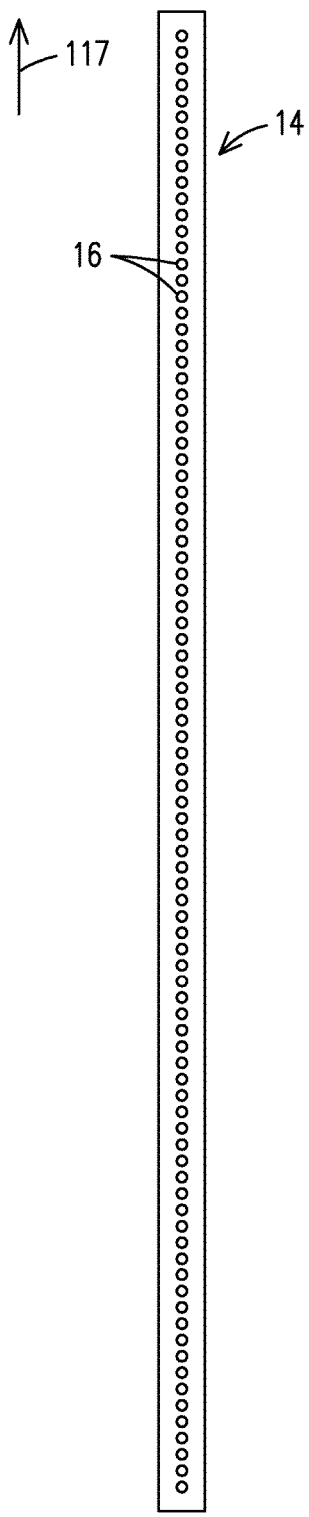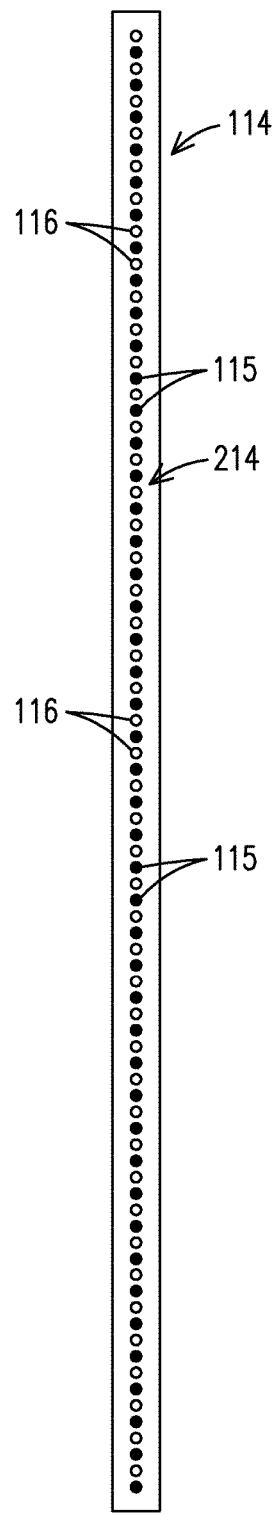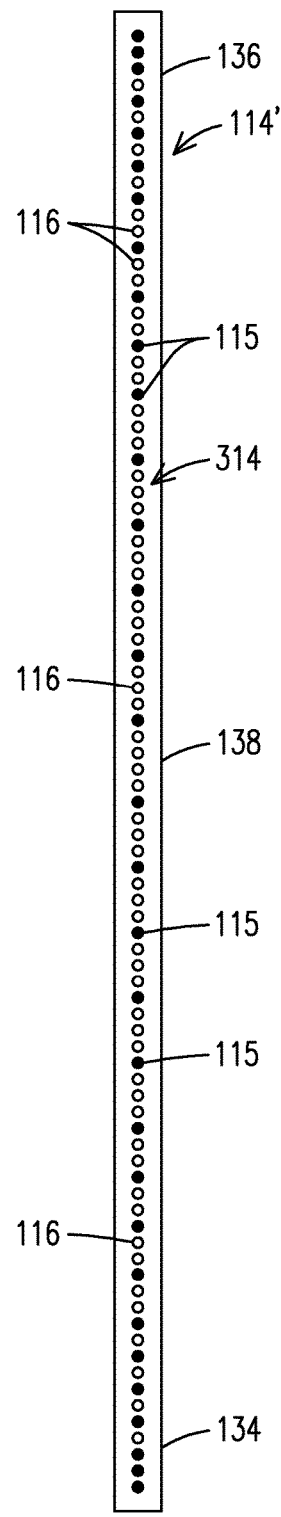
FIG. 6A
PRIOR ART
FIG. 6B
FIG. 6C

TRAILING EDGE COOLING ARRANGEMENT FOR AN AIRFOIL OF A GAS TURBINE ENGINE

FIELD OF THE INVENTION

Aspects of the invention are related to gas turbine engines, and more particularly, to a cooling arrangement for an airfoil of a gas turbine engine.

BACKGROUND OF THE INVENTION

In a gas turbine engine power generating machine, fluid is initially compressed by a compressor, is subsequently heated in a combustion chamber, and the mainstream fluid so produced passes to a turbine section that, driven by the mainstream fluid, does work which may include rotating the compressor. The temperature of the mainstream fluid in the turbine section typically exceeds the melting point of most turbine components, including stationary airfoils and rotating blades. Thus, cooling fluid is routinely passed through an interior of these turbine components, after which the cooling fluid is ejected through cooling holes in the turbine components and into the mainstream fluid.

FIG. 1 illustrates a conventional gas turbine engine 10 with an airfoil 12 that includes a root section 39 and an airfoil section 15 with a trailing edge 14 that is connected to the root section 39. Cooling fluid is passed through an inlet 37 in the root section 39 of the airfoil 12, and internal passages 36 form a serpentine network within the airfoil 12 to direct the cooling fluid within an interior of the airfoil 12. Passages 16 are formed in the trailing edge 14, to eject the cooling fluid 20 into the mainstream fluid (not shown) after the cooling fluid 20 passes through the serpentine network of the airfoil 12.

BRIEF DESCRIPTION OF THE DRAWINGS

The invention is explained in the following description in view of the drawings that show:

FIG. 6A is a rear view of a conventional hole arrangement in a trailing edge of the conventional airfoil of FIG. 1;

FIG. 6B is a rear view of a hole arrangement in the trailing edge of FIG. 4;

FIG. 6C is a rear view of a hole arrangement in the trailing edge of FIG. 4.

DETAILED DESCRIPTION OF THE INVENTION

The present inventor recognized limitations of the conventional approach used for cooling the trailing edge of airfoils within the turbine section of gas turbine engines. Specifically, the inventor recognized that the conventional cooling holes provided along the trailing edge provide radially uniform cooling of the trailing edge, which is not optimal in various scenarios. For example, the inventor recognized that when the gas turbine engine is operating in a high load operating mode, mainstream fluid incident on the airfoil does not have a radially uniform temperature profile, since the mainstream fluid is cooler at the inner and outer radial portions than at the midspan region, which is between the inner and outer radial portions. The inventor also recognized that the conventional radially uniform hole arrangement does not take this radially nonuniform incident temperature profile into account, thereby reducing the cooling efficiency at the trailing edge. The inventor developed a cooling hole arrangement methodology at the trailing edge that is responsive to the nonuniform incident temperature profile in order to optimize the cooling efficiency at the trailing edge.

Another limitation of conventional cooling of the trailing edge recognized by the inventor involves recognizing the benefit of applied or improved thermal barrier coating (TBC) over an outer surface of the airfoil. While the application of TBC causes a radially uniform reduction in the cooling fluid requirement at the trailing edge, the inventor recognized that the conventional cooling hole arrangement along the trailing edge does not optimize the benefit of applied or improved TBC because of the uniformity of the conventional hole arrangement at the trailing edge. The inventor developed a hole arrangement methodology at the trailing edge, which optimizes the benefit of applied or improved TBC on the airfoil.

Figure 1:
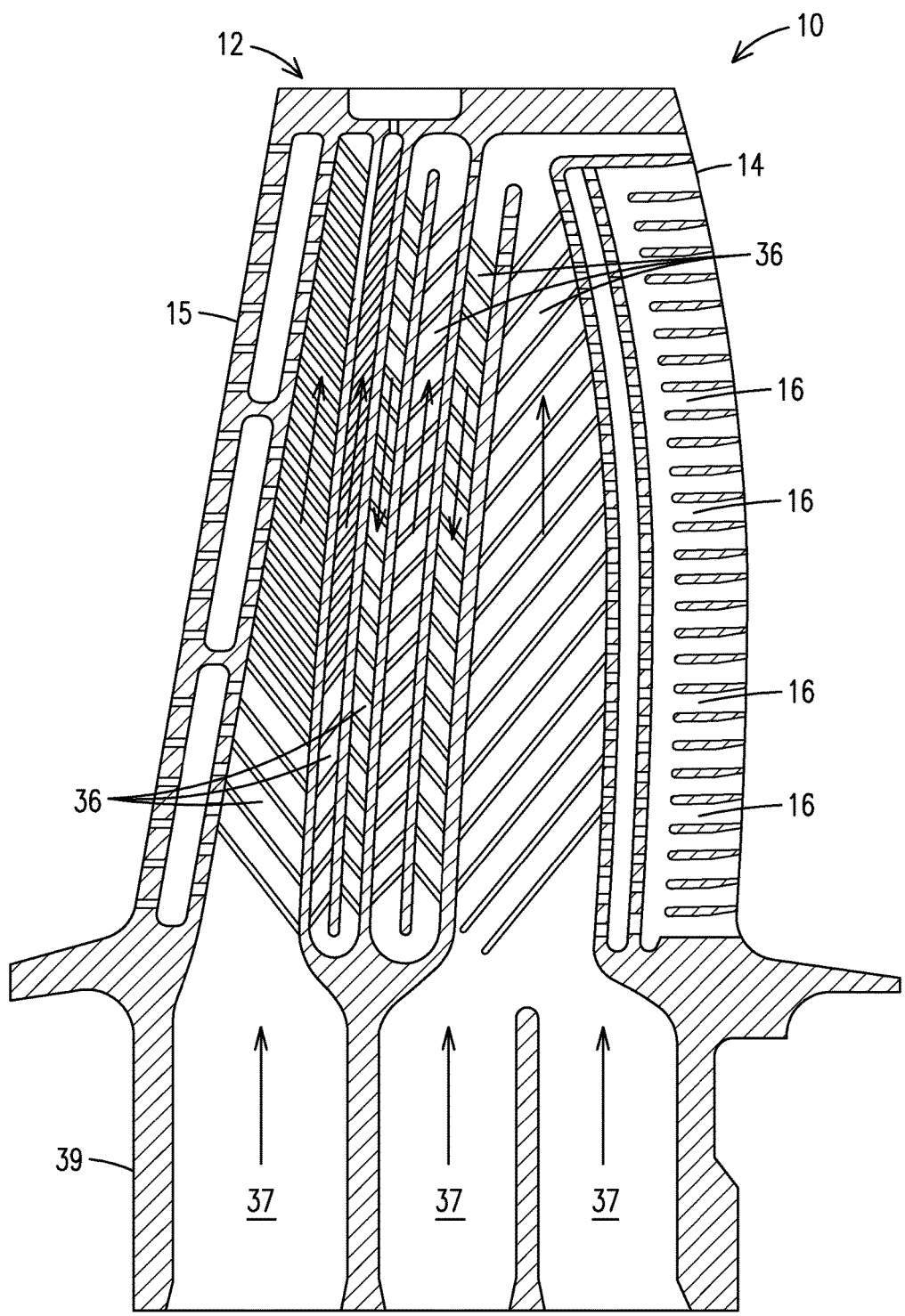
FIG. 1 is a cross-sectional side view of a conventional airfoil in a gas turbine engine.
Figure 2:
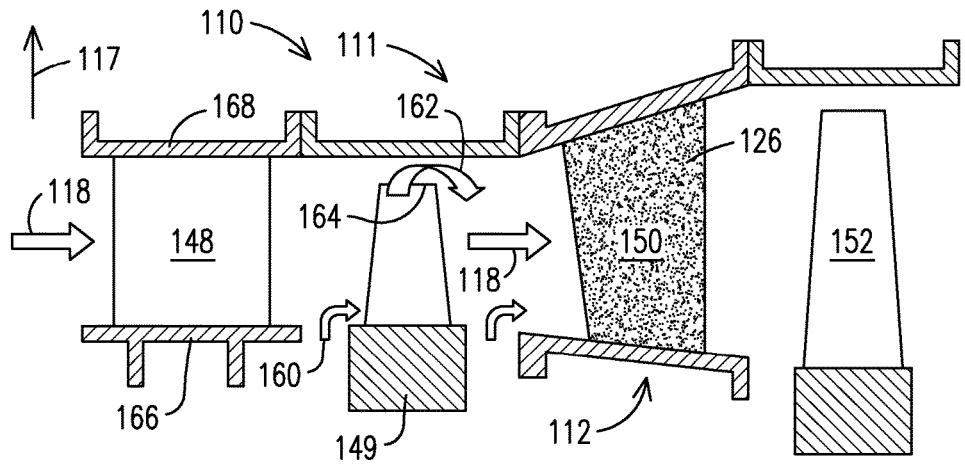
FIG. 2 is a cross-sectional side view of a first and second stage of a turbine section in a gas turbine engine.

FIG. 2 illustrates a first and second stage of a turbine section 111 of a gas turbine engine 110. The turbine section 111 includes a first stage vane 148, a first stage blade 149, a second stage vane 150 and a second stage blade 152. Mainstream fluid 118 is directed into the turbine section 111 from the combustion chamber (not shown) of the gas turbine engine 110. As illustrated in FIG. 2, cooling fluid from the compressor (not shown) of the gas turbine engine 110 is directed through openings (not shown) in an OD (outer diameter) platform 168 of the first stage vane 148 for cooling of the platform, and this fluid subsequently reduces the temperature of the mainstream fluid 118 incident on the second stage vane 150. Similarly, cooling fluid from the compressor (not shown) is directed through openings (not shown) in an ID (inner diameter) platform 166 of the first stage vane 148 and through an opening 160 between the ID platform 166 and the first stage blade 149 for cooling purposes, and this fluid subsequently reduces the temperature of the mainstream fluid 118 incident on the second stage vane 150.

Figure 3:
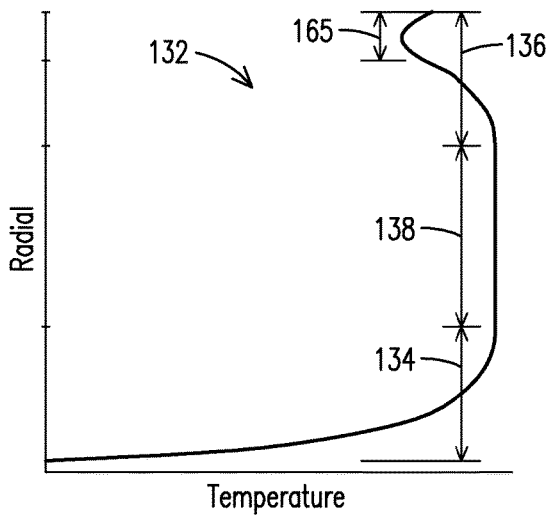
FIG. 3 is a radial temperature profile of mainstream fluid incident on a second stage vane of the turbine section of FIG. 2.

FIG. 3 illustrates the incident temperature profile 132 of the mainstream fluid 118 incident on the second stage vane 150 in the turbine section 110. The incident temperature profile 132 is reduced in an inner radial region 134 because of the cooling fluid directed through the openings in the ID platform 166 and the cooling fluid directed through the opening 160. In an exemplary embodiment, the cooling fluid reduces the incident temperature profile 132 in the inner radial region 134, which is approximately 40% of the incident temperature profile 132, for example. The incident temperature profile 132 is also reduced in an outer radial region 136 because of the cooling fluid directed through the openings in the OD platform 168. In an exemplary embodiment, the cooling fluid reduces the incident temperature profile 132 in the outer radial region 136, which is approximately 30% of the temperature profile 132, for example. The incident temperature profile 132 is increased in the outer-most radial region 165 by leakage 162 (FIG. 2) of the mainstream fluid 118 around a tip region 164 (FIG. 2) of the first stage blade 149. In an exemplary embodiment, the leakage 162 increases the incident temperature profile 132 in the outer-most radial region 165, which is approximately 10% of the temperature profile 132, for example. The incident temperature profile 132 depicted in FIG. 3 is merely one exemplary temperature profile of mainstream fluid incident on the second stage vane 150. Indeed, the embodiments of the present invention are not limited to this specific incident temperature profile and may encompass any incident temperature profile within the gas turbine engine that is incident on a component of the gas turbine engine, in order to design a hole arrangement at the trailing edge of the component, which takes the incident temperature profile into account in order to optimize cooling efficiency at the trailing edge.

Figure 4:
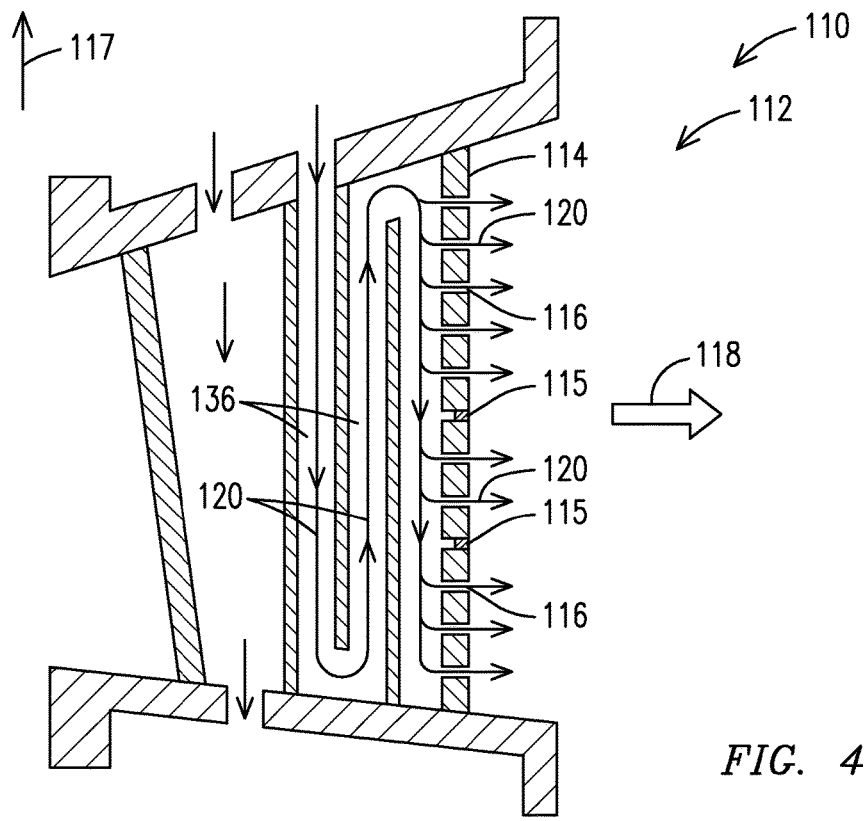
FIG. 4 is a cross-sectional side view of an airfoil in a gas turbine engine where the cooling holes of the trailing edge are selectively plugged.

FIG. 4 illustrates an airfoil 112 at the second stage vane 150 of the turbine section 111. The airfoil 112 includes an internal cooling circuit 136 to direct cooling fluid 120 through an interior of the airfoil 112. The airfoil 112 also includes a trailing edge 114 that defines cooling holes 116 along a radial direction 117. The cooling holes 116 in the trailing edge 114 are coupled to the internal cooling circuit 136, so that cooling fluid 120 directed through the internal cooling circuit 136 is subsequently ejected through the cooling holes 116 and into the mainstream fluid 118 downstream of the trailing edge 114. Although the embodiments discussed herein are directed to the airfoil 112 of the second stage vane 150, the embodiments of the present invention are not limited to the airfoil 112 of the second stage vane 150, and may be employed for any airfoil or other component used in any section of the gas turbine engine 110.

Figure 5A:
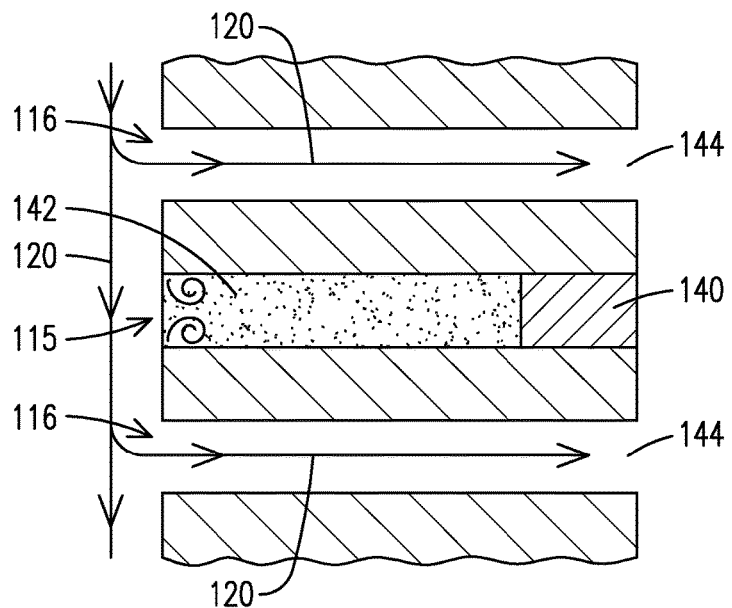
FIG. 5A is a partial cross-sectional side view of the trailing edge of FIG. 4.
Figure 5B:
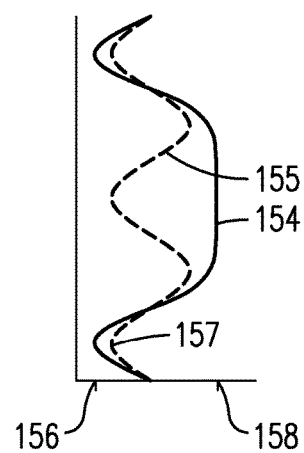
FIG. 5B is a partial view of the temperature profile of the trailing edge shown in FIG. 5A.

As further illustrated in FIG. 4, plugged holes 115 are defined as a selective group of the cooling holes in the trailing edge 114 of airfoil 112, such that cooling fluid 120 is not ejected through the plugged holes 115. FIG. 5A illustrates a region of the trailing edge 114 of FIG. 4, where one plugged hole 115 is positioned between two cooling holes 116. The plugged hole 115 is defined by positioning a plug 140 within the outlet 144 of the plugged hole 115, resulting in a cavity 142 where the cooling fluid 120 is not allowed to flow through, but rather stagnates. In an exemplary embodiment, the plug 140 may be a fabricated piece positioned at the outlet 144 using a modern brazing or welding operation that is capable of effectively plugging the outlet 144 of the plugged hole 115, for example. Alternatively, a sprayed material may be used to create the plug 140, or a standard brazing or standard welding build-up technique may be used to create the plug 140. FIG. 5B illustrates a radial temperature profile 154 of the trailing edge 114 for the plugged hole 115 arrangement between the cooling holes 116, with a plugged hole temperature 158 at the plugged hole 115 that is greater than the cooling hole temperature 156 at the adjacent cooling holes 116. Similarly, FIG. 5B illustrates a radial temperature profile 155 of the trailing edge 114 for an arrangement (not shown) where all three holes are cooling holes 116, and in which the cooling hole temperature 157 exists at all three holes. Thus, by implementing the plug 140 to create the plugged hole 115, the temperature at the radial position of the plugged hole 115 increases from that of the cooling hole temperature 157 to the plugged hole temperature 158. As a result, plugged holes 115 can be selectively positioned along the trailing edge 114 of the second stage vane 150, based on the desired radial temperature profile of the trailing edge 114.

The selective group of plugged holes 115 and cooling holes 116 along the trailing edge 114 is determined in response to a reduced cooling fluid requirement at the trailing edge 114. In exemplary embodiment, the reduced cooling fluid requirement at the trailing edge 114 is attributable to covering an outer surface of the airfoil 112 with a TBC 126 (FIG. 2) or improving a pre-existing TBC over the outer surface of the airfoil 112, such as by thickening the TBC or using a TBC with improved characteristics, for example. In an exemplary embodiment, the TBC layer may be increased in thickness by approximately 60%, which reduces the cooling fluid requirements at the trailing edge 114 by approximately 30%, for example. In another exemplary embodiment, the thickness of the TBC layer on the second stage vane 150 may be increased from approximately 0.360 mm to approximately 0.575 mm, which causes a reduction in the cooling fluid requirement at the trailing edge from approximately 0.254 kg/s to approximately 0.179 kg/s, for example. FIG. 6B illustrates a selective group 214 of plugged holes 115 and cooling holes 116 along the trailing edge 114 to accommodate the TBC 126 on the airfoil 112. As illustrated in FIG. 6B, the selective group 214 has plugged holes 115 that are positioned in a uniform distribution in the radial direction 117 along the trailing edge 114, since the TBC 126 causes a radially uniform reduction in the cooling fluid requirements at the trailing edge 114. Additionally, as illustrated in FIG. 6B, the selective group 214 has plugged holes 115 that have an intermittent arrangement, in which a fixed amount of plugged holes 115 are positioned at regular intervals along the radial direction 117 of the trailing edge 114. For example, the selective group 214 may have plugged holes 115 positioned between every second cooling hole 116 along the radial direction 117 of the trailing edge 114, for example. In an exemplary embodiment, the selective group 214 of plugged holes 115 and cooling holes 116 of FIG. 6B may be performed in the trailing edge 114 of the airfoil 112 at the second stage vane 150 when the gas turbine engine 110 is operating in a mixed-mode with an approximate equal amount of time in both a high and low load operating condition, for example. However, the use of a selective group 214 as shown in FIG. 6B is not limited to any particular operating mode of the gas turbine engine 110, provided that the arrangement of plugged holes 115 and cooling holes 116 enhances the cooling efficiency at the trailing edge 114 during the operation of the gas turbine engine 110.

In an exemplary embodiment, an operating parameter of the gas turbine engine 110, such as load setting or ambient condition, may be used to determine the radial cooling fluid requirement at the trailing edge 114, and thus used to determine the selective arrangement of plugged holes 115 and cooling holes 116 at the trailing edge 114. In an exemplary embodiment, the reduced cooling fluid requirement at the trailing edge 114 is attributable to the incident temperature profile 132 (FIG. 3) of the mainstream fluid 118 on the second stage vane 150. FIG. 6C illustrates a selective group 314 of plugged holes 115 and cooling holes 116 along the trailing edge 114' to accommodate the incident temperature profile 132. As illustrated in FIG. 6C, the selective group 314 has plugged holes 115 that are positioned in a non-uniform distribution in the radial direction 117 along the trailing edge 114' based on a non-uniform distribution of the incident temperature profile 132 in the radial direction 117. The selective group 314 has plugged holes 115 that are radially biased toward the inner radial region 134 and the outer radial region 136 of the trailing edge 114', to account for the incident temperature profile 132 being radially skewed in the inner and outer radial regions 134, 136 relative to the midspan region 138 of the trailing edge 114'. Thus, the radial temperature profile 154 of the trailing edge 114' is enhanced in the midspan region 138 and attenuated in the inner and outer radial regions 134,136, by positioning a greater number of plugged holes 115 in the inner and outer radial regions 134,136 than in the midspan region 138. Thus, the radial temperature profile 154 of the trailing edge 114' is enhanced in the midspan region 138, to counteract the higher temperature of the incident temperature profile 132 at the midspan region 138, thereby optimizing the cooling efficiency at the trailing edge 114'. Similarly, the radial temperature profile 154 of the trailing edge 114' is attenuated at the inner and outer radial regions 134, 136, based on the lower temperature of the incident temperature profile 132 at the inner and outer radial regions 134, 136, to further optimize the cooling efficiency at the trailing edge 114'. In an exemplary embodiment, the selective group 314 of plugged holes 115 and cooling holes 116 of FIG. 6C may be formed in the trailing edge 114 of the airfoil 112 at the second stage vane 150 when the gas turbine engine 110 is operating in a predominantly high load operating condition. However, the selective group 314 of FIG. 6C is not limited to any particular operating mode of the gas turbine engine 110, provided that the arrangement of plugged and cooling holes 115, 116, enhances the cooling efficiency at the trailing edge 114' during the operation of the gas turbine engine 110.

In contrast with the selective group arrangements 214, 314 of FIGS. 6B and 6C, which are optimized to varied cooling fluid requirements at the airfoil 112 trailing edge 114, 114', FIG. 6A illustrates a conventional trailing edge 14, without plugged holes 115. Thus, the conventional trailing edge 14 provides a fixed, uniform radial temperature profile along the trailing edge 14, which does not account for variation in the cooling fluid requirement at the trailing edge 14 and thus does not provide optimum cooling efficiency for the mixed-mode and high load operating conditions of the gas turbine engine. Indeed, the selective group arrangements 214, 314 of FIGS. 6B and 6C of the trailing edge 114, 114' provide an improvement over the configuration of FIG. 6A of the conventional trailing edge 14, when the gas turbine engine 110 is operating in one of the mixed-mode or high load operating conditions.

Figure 7:
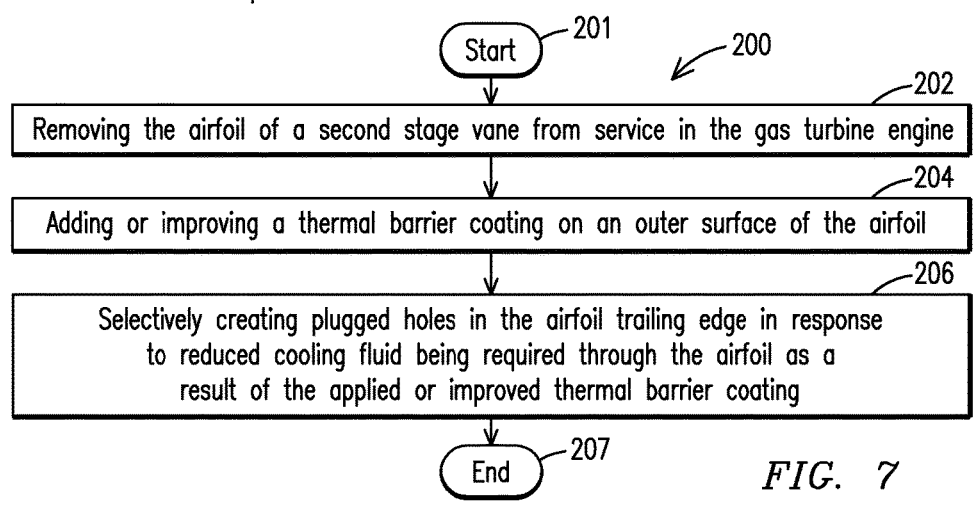
FIG. 7 is a flowchart depicting a process for a component of a gas turbine engine.

FIG. 7 illustrates a flowchart depicting a process 200 for a component of the gas turbine engine 110, such as the airfoil 112 used at the second stage vane 150, for example. The process 200 begins at 201 by removing 202 the airfoil 112 at the second stage vane 150 from service in the gas turbine engine 110. The process 200 further includes adding or improving 204 a TBC 126 on an outer surface of the airfoil 112. The process 200 then includes selectively 206 creating plugged holes 115 in the airfoil trailing edge 114 in response to reduced cooling fluid being required through the airfoil 112, as a result of the applied or improved TBC 126, before ending at 207. Although the process 200 depicted in FIG. 7 involves the removal of the airfoil 112 at the second stage vane 150 of the turbine section 111, the process 200 of the present invention is not limited to this component of the gas turbine engine, and encompasses any component of the gas turbine engine which may be removed to add or improve a TBC layer on the component, after which plugged holes in the component may be selectively created, to accommodate a reduced cooling fluid requirement attributable to the added or improved TBC layer.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An airfoil for a gas turbine engine comprising:
an internal cooling circuit to direct cooling fluid through an interior of the airfoil; and
a trailing edge comprising a plurality of cooling holes in a row along a radial direction, said plurality of cooling holes coupled to the internal cooling circuit;
a thermal barrier coating on an outer surface of the airfoil to reduce a cooling requirement at the trailing edge; and
plugs inserted within a selective group of the row of the plurality of cooling holes such that the plugs create respective cavities of the internal cooling circuit, and wherein the plugs are fixed to stagnate cooling fluid in the respective cavities during operation of the cooling circuit in the gas turbine engine, wherein the plugs within the selective group of the row of the plurality of cooling holes are located along the trailing edge based on characteristics of the thermal barrier coating on the outer surface of the airfoil,
wherein the thermal barrier coating causes a radially uniform reduction in the cooling requirement at the trailing edge, and
wherein the plugs within the selective group of the row of the plurality of cooling holes are in a uniform distribution in the radial direction along the trailing edge, the plugs comprising an intermittent arrangement with a fixed amount of plugged holes not limited to any particular operating mode of the gas turbine engine and at regular intervals along the radial direction of the trailing edge.

2. The airfoil of claim 1, wherein locations of the plugs are based on the cooling requirement at the trailing edge.

3. The airfoil of claim 2, wherein a mainstream fluid incident on the airfoil has an incident temperature profile in the radial direction, and wherein said cooling requirement is based on the incident temperature profile.

4. A process comprising:
removing a component from service in a gas turbine engine;
adding or improving a thermal barrier coating on the component to reduce a cooling requirement; and
selectively plugging cooling holes in the component with a plugs fixed within select cooling holes such that the plugs create respective cavities within the select cooling holes and stagnate cooling fluid in the respective cavities, and wherein the plugs are secured within the select cooling holes based on a reduced cooling requirement through the component, wherein the plugs within the select cooling holes are positioned based on characteristics of the thermal barrier coating on the component.

5. The process of claim 4, wherein the component is an airfoil of a turbine section of the gas turbine engine and wherein the select cooling holes are in a trailing edge of the airfoil.

6. The process of claim 4, further comprising selectively plugging an intermittent group of the cooling holes in the component based on the gas turbine engine operating in a mixed-mode with an approximate equal amount of time in both a high and a low load operating condition.

7. The process of claim 4, further comprising selectively plugging a radially biased group of the cooling holes in an inner radial region and an outer radial region of the component based on the gas turbine engine operating in a predominantly high load operating condition.

* * * * *